United States Patent [19]

Pickles

[11] 4,331,313
[45] May 25, 1982

[54] 6-WAY SPLIT BENCH SEAT ADJUSTER

[75] Inventor: Joseph Pickles, Birmingham, Mich.

[73] Assignee: Ferro Manufacturing Corporation, Southfield, Mich.

[21] Appl. No.: 106,710

[22] Filed: Dec. 26, 1979

[51] Int. Cl.³ .................. A45D 19/04; A47J 47/16; F16M 16/00
[52] U.S. Cl. ................................. 248/394; 248/397
[58] Field of Search .................. 248/394, 393, 397; 297/248; 310/83

[56] References Cited

U.S. PATENT DOCUMENTS

| | | | |
|---|---|---|---|
| 2,837,931 | 6/1958 | Brundage | 248/393 X |
| 3,410,515 | 11/1968 | Posh | 248/394 |
| 4,073,459 | 2/1978 | Pickles | 248/394 |
| 4,086,753 | 5/1978 | Tsuchiya | 310/83 X |

Primary Examiner—Wayne L. Shedd
Attorney, Agent, or Firm—Whittemore, Hulbert & Belknap

[57] ABSTRACT

A 6-way seat adjuster for motor vehicles in which a three armature motor is mounted on a slidable seat frame and has connections to front and rear lift devices on the frame and a horizontal adjuster. The motor is mounted on a transmission housing in which is located an integral spacer and bearing unit formed of a rigid low friction polymer. Each armature shaft of the motor has an integral primary driving worm adjacent its outer end, and each primary worm is in mesh with a primary worm gear. The primary worm gears are fixed to drive shafts to each of which is fixed a secondary driving worm in mesh with a secondary worm gear fixedly connected to a pinion. Two of the pinions are in mesh with toothed sectors provided on pivoted lift levers connected respectively to the front and rear edges of a vehicle seat. The third secondary worm gear is fixed to a drive shaft having a pinion fixedly connected thereto which cooperates with a stationary rack for moving the frame horizontally.

11 Claims, 24 Drawing Figures

6-WAY SPLIT BENCH SEAT ADJUSTER

BRIEF SUMMARY OF THE INVENTION

Seat supporting and adjusted mechanism providing for vertical, tilting, and fore and aft adjustment of vehicle seats are referred to as 6-way seat adjusters, and comprise lift mechanism for the front and rear seat edges which can be simultaneously operated to raise or lower a seat or independently operated, to provide a tilting adjustment. This mechanism is carried by a frame slidable horizontally to provide a fore and aft adjustment. Lift mechanism comprising pivoted lift levers including toothed sectors actuated by pinions, and horizontal adjusting mechanism comprising fixed racks and pinions carried by the slide frame are also known.

Seat supporting and adjusting mechanism as so far described is disclosed in my prior U.S. Pat. No. 4,073,459, granted Feb. 14, 1978.

It has also been known to provide for actuation of front and rear seat lifting mechanisms, either separately or simultaneously, together with horizontal adjusting mechanism by an electric motor having three separate independently operated armatures. Such mechanisms are disclosed in my prior U.S. Pat. No. 3,437,303 granted Apr. 8, 1969.

The present invention is an improvement over the structure disclosed in my prior patents, identified above, resulting in a more efficient, reliable, economical and quiet seat adjusting and supporting structure.

An important improvement is in the three armature motor, in which the armature shafts comprise integral driving worms, thus eliminating the cost of couplings and providing a more efficient power transmission, which permits the use of smaller and less expensive motor. This not only provides economy in space, but also results in weight saving, a particularly valuable feature under present conditions.

A second important improvement is in an improved transmission housing assembly comprising an integral spacer and bearing unit formed of a rigid, low friction polymer which facilitates assembly of the power train elements terminating in three separately operable actuating pinions. The spacer and bearing unit is essentially a flat elongated element with provision for receiving, locating, and partly supporting the several shafts and gearing of the transmission.

The spacing and bearing unit is necessarily a complex structure which lends itself to production by injection molding, with the result that a multiplicity of the elements may be rapidly and economically produced without dimensional variations.

DETAILED DESCRIPTION

Figure 1:
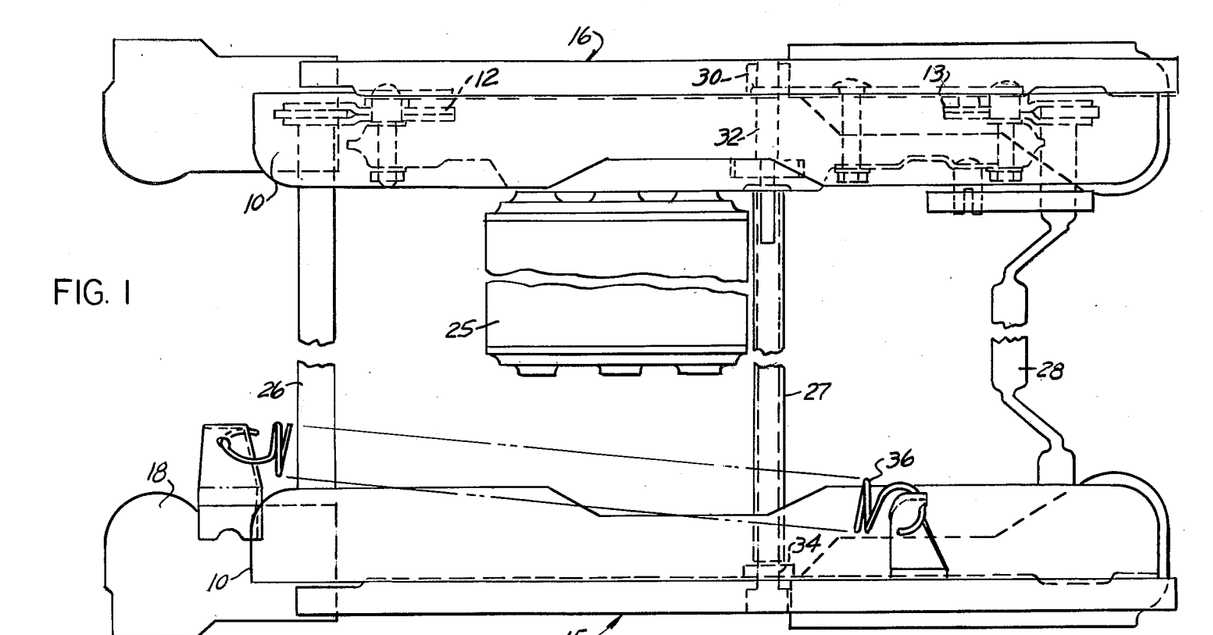
FIG. 1 is a fragmentary plan view of the seat supporting and adjusting mechanism.
Figure 2:
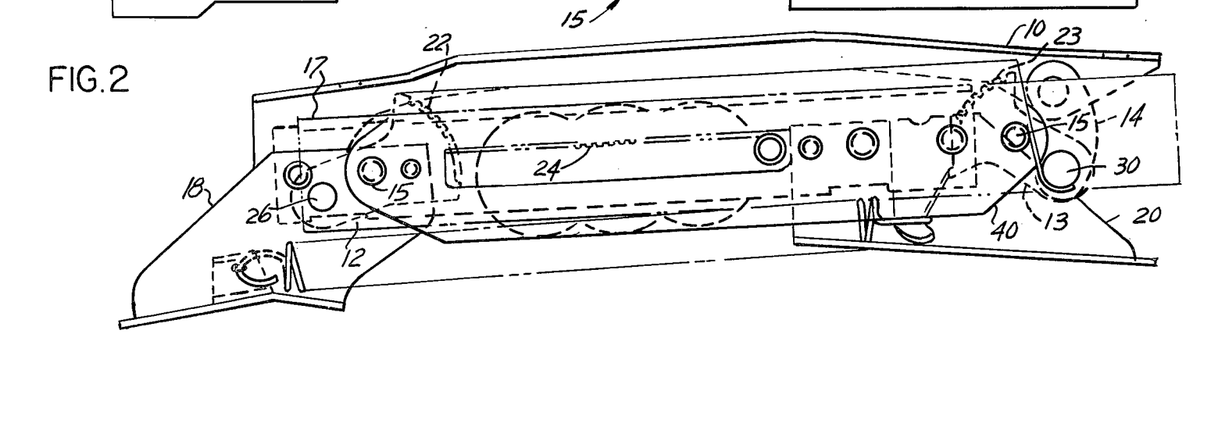
FIG. 2 is a fragmentary side elevation of the mechanism of FIG. 1.
Figure 3:
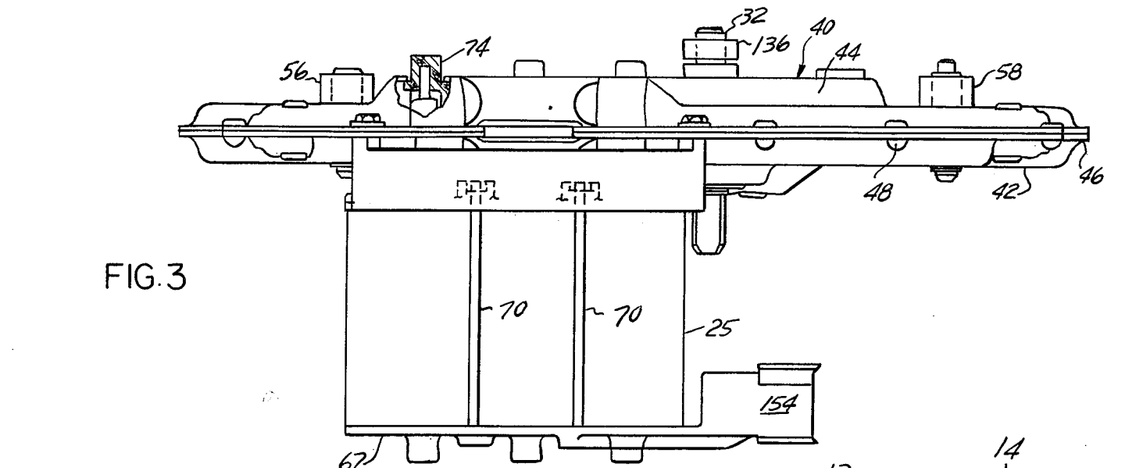
FIG. 3 is a plan view of the master side transmission.
Figure 4:
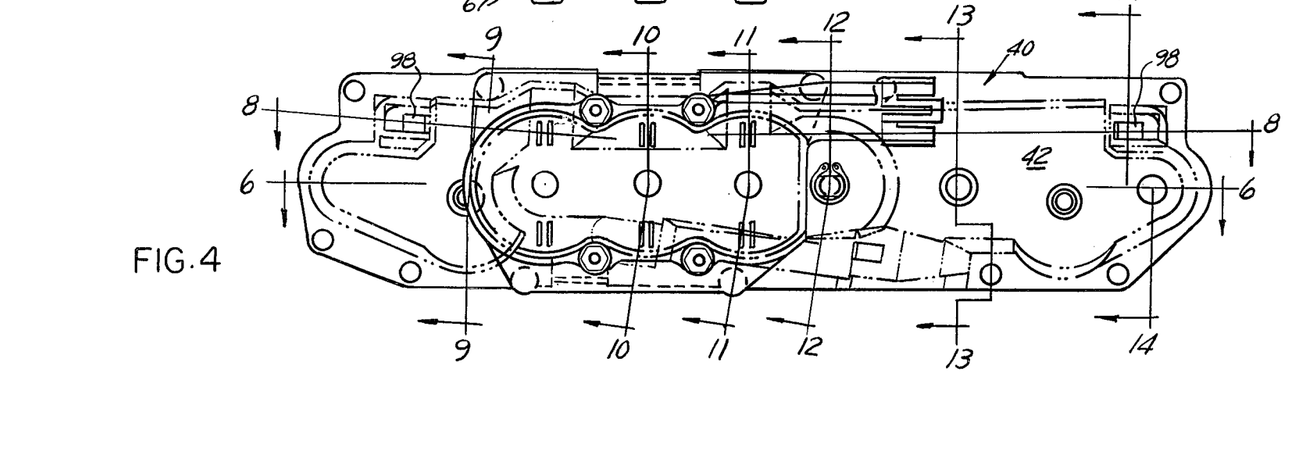
FIG. 4 is an inner side elevation of the structure of FIG. 3.

Referring first to FIGS. 1 and 2, it is to be understood that the mechanism is associated with a vehicle seat, which is not illustrated herein. The seat may be of the bench or bucket type and is rigidly connected at its ends to seat support bars 10. The seat frame is rigid, and thus the end support bars 10 become part of a rigid seat structure.

Bars 10 are pivotally connected at one end to lift levers 12, and at the other end are connected to lift levers 13 by links 14. Lift levers 12 and 13 are pivotally connected as indicated at 15, intermediate their end to a slidable carrier frame 16 which includes at its sides elongated rigid slides 17 mounted for longitudinal sliding movement on brackets 18, 20.

Lift levers 12 and 13 are provided at one end with toothed sectors 22 and 23, which are in mesh with driving pinions, later to be described.

In order to provide for fore and aft adjustment, racks 24 are mounted in fixed position adjacent the carrier frame, and pinions movable with the slidable carrier frame 16 are in mesh with the racks.

It will thus be seen that to effect the desired 6-way seat adjustment, two sets of pinions in mesh with the toothed sectors 22 and 23, and a third set of pinions in mesh with the racks 24 are required, and each set of pinions is capable of independent forward or reverse rotation.

For this purpose, a three armature motor 25 is mounted on carrier frame 15, and is connected to worm and worm gear transmissions to the pinions at the master side of the frame. In addition, torsion bars or tubes 26, 27 and 28 extend between the master side carrying motor 25, and the slave side, which is provided with lift levers and a horizontal drive pinion thus actuated in synchronism with the corresponding lift levers 12 and 13 and rack pinion 30 at the master side.

Torsion tube 27 extends directly between the shafts 32 and 34 carrying the pinions which mesh with racks 22. Torsion bars 26 and 28 are fixedly connected at their ends to the ends of lift levers 12, 13, remote from the toothed sectors, and hence corresponding lift levers at the master and slave side of the structure have identical movement.

Normally the trackway provided by brackets 18 and 20 is slightly inclined from the horizontal and tension spring 36 is provided to bias the slidable carriage 16.

Figure 15:
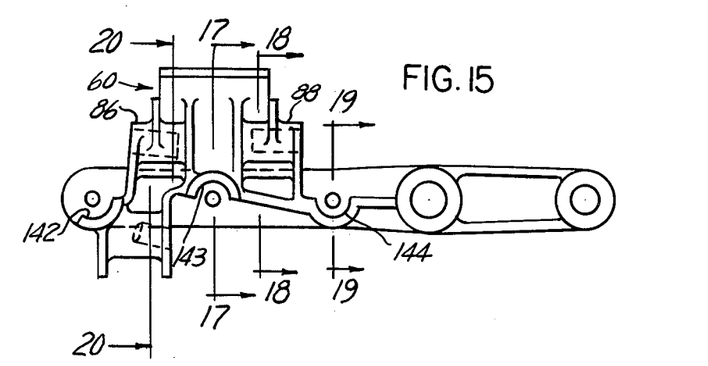
FIG. 15 is a side elevation of a bearing and spacer unit.
Figure 16:
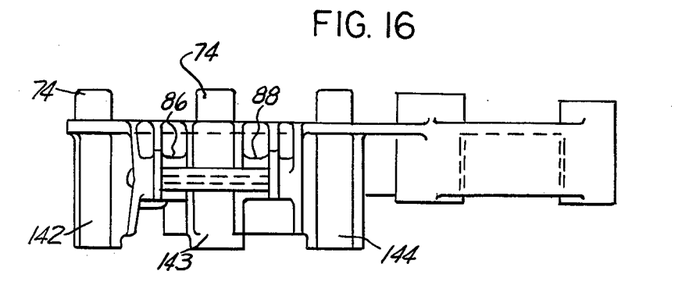
FIG. 16 is a plan view of the bearing and spacer unit.

Referring now more particularly to FIGS. 3-18, there is illustrated the construction at the master side of the structure, including the motor 25, the transmission connecting the motor to the output pinions, and the transmission housing 40. Housing 40 is generally flat and elongated, comprising inner dished plate 42 and outer dished plate 44. The dished plates have peripheral abutting connection flanges 46 riveted together as best illustrated at 48 in FIG. 13. Plates 42 and 44 are metal stampings and fixedly secured within the interior of housing 40 is a spacer and bearing unit 60. Unit 60 is of a complex configuration, details of which are best illustrated in FIGS. 15, 16 and in numerous fragmentary sectional views. It serves primarily as means for locating and providing bearings for transmission elements. For this reason it is formed of a suitable polymeric resin, such as an acetal polymer available under the trade name Celcon and identified as M90-04. This material is suitable for injection molding by which operation units 60 may be produced in quantity and without significant dimensional variation. In addition, the acetal polymer is a low friction material and provides shaft supports equivalent to separately provided bearings.

Figures 8, 10, 11, 13, 14:
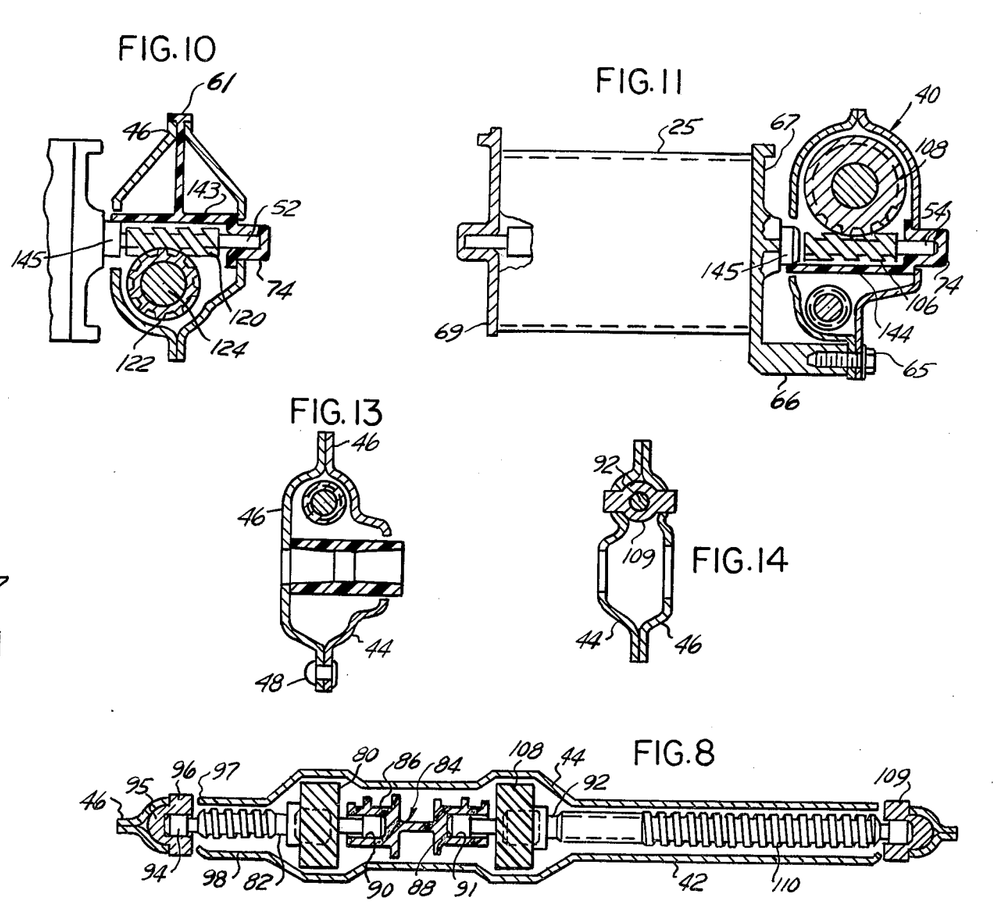
FIG. 8 is a fragmentary section on line 8—8, FIG. 4.
FIG. 10 is a fragmentary section on line 10—10, FIG. 4.
FIG. 11 is a fragmentary section on line 11—11, FIG. 4.
FIG. 13 is a fragmentary section on line 13—13, FIG. 4.
FIG. 14 is a fragmentary section on line 14—14, FIG. 4.
Figure 9:
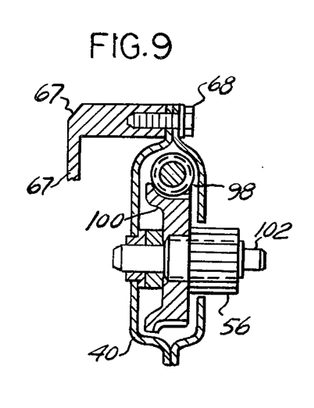
FIG. 9 is a fragmentary section on line 9—9, FIG. 4.
Figure 20:
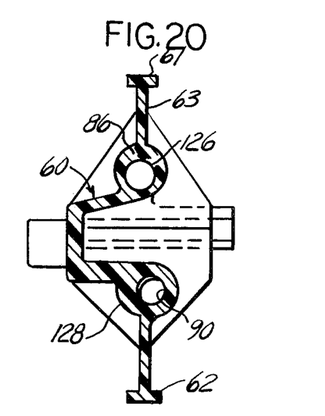
FIG. 20 is a fragmentary sectional view on line 20—20, FIG. 14.

Unit 60 is provided with upper assembly flange 61 and lower assembly flange 62, best seen in FIG. 20, which cooperate with flanges 46 of housing plates 42 and 44, as best seen in FIG. 10, where upper flange 61 is located at the top of web 63 which extends to the outside of housing 40 and is received between and abuts edge flanges 46. Lower flange 62 is similarly secured.

Motor 25 is a three armature motor provided with permanent magnet poles, of a type disclosed in my prior U.S. Pat. No. 3,437,303. The three armature shafts, which will be described in detail subsequently are illustrated at 50, 52 and 54, best seen in FIG. 6 which are respectively connected by suitable transmission to the front lift pinion 56, the rack engaging pinion 57, and the rear lift pinion 58. As best seen in FIG. 11, motor 25 is mounted on depending flange portions 64 of housing 40 by self tapping screws 65 extending into a thickened laterally extending flange 66 on the end plate 67 of motor. End plate 67 of motor 25 is attached at the top to housing 40 by self tapping screws 68. End plate 67 is connected to end plate 69 by assembly rods 70.

Figure 6:
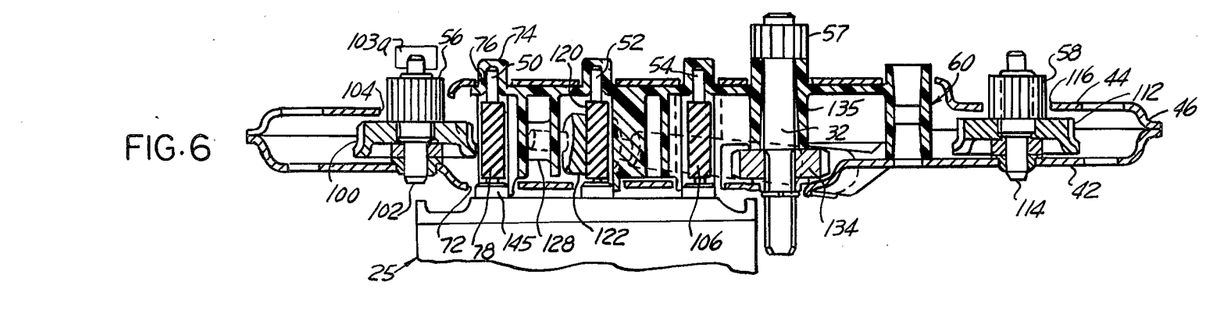
FIG. 6 is a section on the line 6—6, FIG. 4.
Figure 7:
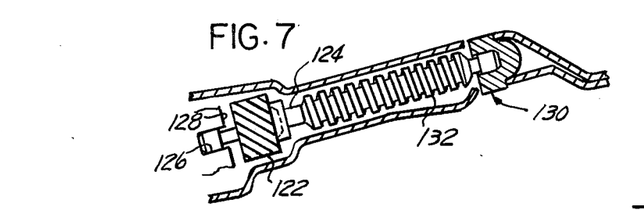
FIG. 7 is a fragmentary section on line 7—7, FIG. 4.

Armature shafts 50, 52 and 54 extend through openings 72 in inner housing plate 42, and the unit 60 is formed with three integral shaft locator and bearing lugs 74 which extend with clearance as shown in FIG. 6 through openings 76 provided in outer plate 44. Lugs 74 have blind, cylindrical recesses which locate and serve as bearings for the outer ends of the armature shafts.

Front Lift

Figure 5:
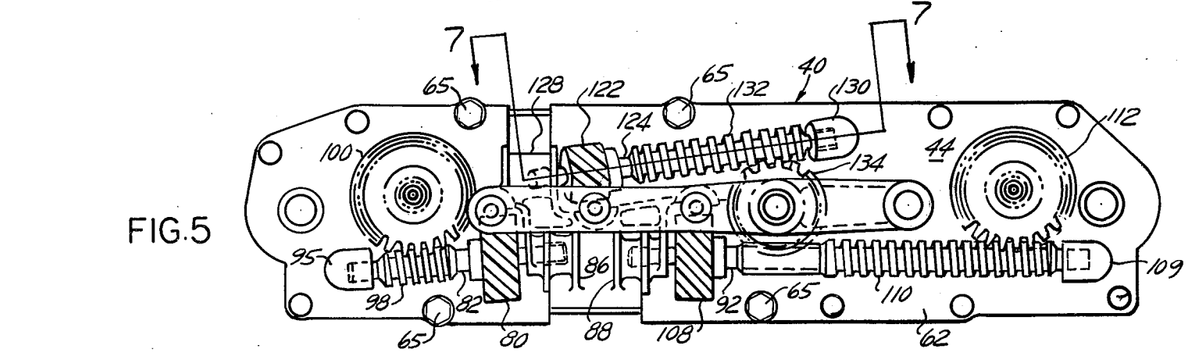
FIG. 5 is a diagrammatic rear side elevation of the structure of FIG. 3.

Primary worm 78 on shaft 50 is in mesh with primary worm gear 80 carried by shaft 82 as seen in FIG. 5. Unit 60 has an intermediate portion 84 provided with enlargements 86 and 88 having oppositely facing blind cylindrical recesses 90, 91 (FIG. 8) receiving the enlarged outer ends of shaft 82 and a rear lift transmission shaft 92, to be subsequently described. While in FIG. 8 recesses 90 and 91 appear to be in alignment, reference to FIG. 5 shows the true angular relationship of the recesses and the shafts which they receive.

Primary shaft 82 at its other, or forward end, has an enlargement 94, received in a separate bearing 95 having locating lugs 96 received in openings 97 in housing plates 42, 44. Shaft 82 carries a secondary worm 98 which is in mesh with secondary worm gear 100 fixed to secondary shaft 102 which in turn carries front lift pinion 56. The inner end of shaft 102 is rotatable in bearing 103 fixed to the inner side of plate 42, and its outer end is journaled in bearing 103a fixed to the seat slide members 17. Pinion 56 extends through opening 104 to the exterior of housing 40.

Rear Lift

Primary worm 106 is carried by shaft 54 and meshes with primary worm gear 108 as best seen in FIG. 11. Worm gear 108 is carried by the shaft 92, the ends of which are journaled in enlargement 88 in unit 60 and in bearing 109 mounted in the cavity between plates 42, 44 in the same manner as bearing 95. Shaft 92 further carries secondary worm 110. Worm 110 is in mesh with secondary worm gear 112 which is fixed to shaft 114. Shaft 114 also carries rear lift pinion 58, which extends through opening 116 in outer housing plate 44 as seen in FIG. 6.

Horizontal

Primary worm 120 is fixed to armature shaft 52 and is in mesh with primary worm gear 122 on shaft 124 which is journaled at one end in cylindrical recess 126 formed in an intermediate projection 128 of unit 60, as best seen in FIGS. 5 and 6. The other end of shaft 124 is journaled in bearing 130 similar to bearing 96 as previously described.

Shaft 124 carries secondary worm 132 which is in mesh with secondary worm gear 134 carried by shaft 32. Shaft 32 is journaled in a generally tubular portion 135 of unit 60 and at its outer end, outside housing 40, shaft 32 carries rack-engaging pinion 57.

Figure 12:
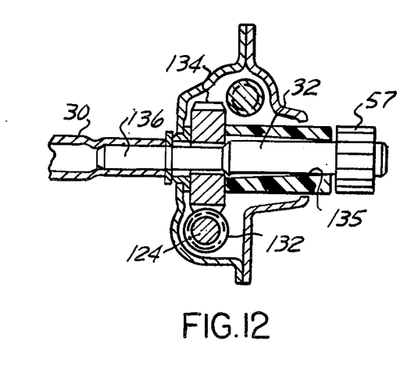
FIG. 12 is a fragmentary section on line 12—12, FIG. 4.

As best seen in FIG. 12 the shaft 32 has its inner end portion flattened as indicated at 136 and the torsion transmitting tube 27 has its end portions flattened down to engage the flattened shaft portion 136 and a similar flattened shaft end portion at the slave side of the apparatus.

Spacer and Bearing Unit

Details of spacer and bearing unit 60 are further shown in FIGS. 15-20. As previously described, this unit is formed of a polymeric resin, such as an acetal polymer. The unit is dimensionally stable and serves to locate and support the critical components of the transmission trains connection motor shafts 50, 52 and 54 to the pinions for actuating the lift and horizontal adjustment devices.

Figure 17:
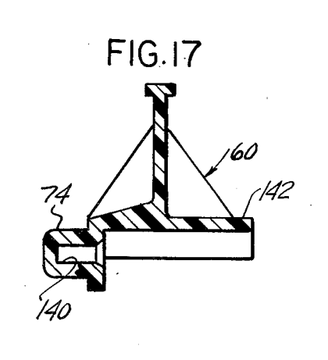
FIG. 17 is a fragmentary section on line 17—17, FIG. 14.
Figure 18:
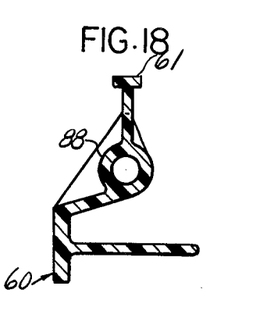
FIG. 18 is a fragmentary section on line 17—17, FIG. 14.
Figure 19:
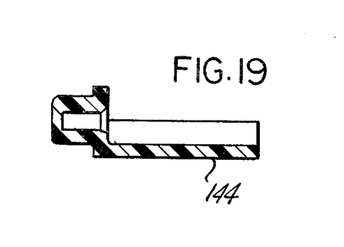
FIG. 19 is a fragmentary section on line 18—18, FIG. 14.

The motor 25 is fixedly mounted on the housing 40, which in turn supports the unit 60 in fixed relation therein. It will be observed that unit 60 has the lugs projecting outwardly opposite the armature shafts 50, 52 and 54, each of which is provided with an inwardly facing blind cylindrical opening 140 as best seen in FIG. 17 which receives and provides an efficient journal for the outer end of the associated armature shaft.

At each of the lugs 74, unit 60 is provided with cylindrically formed partly tubular projections 142, 143 and 144 which at the ends remote from the lugs 74 are dimensioned to fit around approximately 180° of journal bosses 145 on the motor 25. The intermediate portions of projections 142, 143 and 144 have clearance with respect to the associated primary worms, as illustrated for example in FIGS. 10 and 11. However, the engagement of journal bosses 145 therewith ensures proper location of unit 60 with the output shafts and primary worms of the motor. As best seen in FIG. 15, the concave side of projections 142 and 144 face generally upwardly while the concave side of intermediate projection 143 faces upwardly. This insures that unit 60 is precisely located vertically with respect to armature shafts, while the generally cylindrical shape of the recesses insures proper horizontal location.

Motor

Reference is now made more particularly to FIGS. 20-23.

Figure 21:
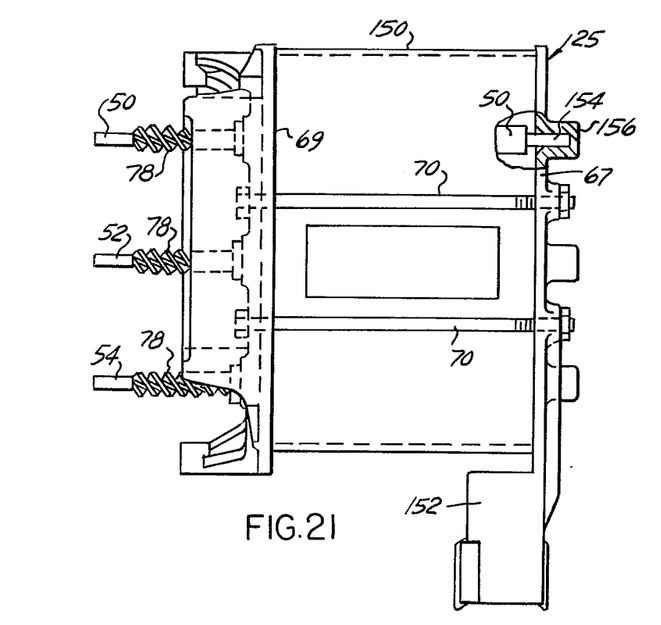
FIG. 21 is a plan view of the three armature motor.
Figure 22:
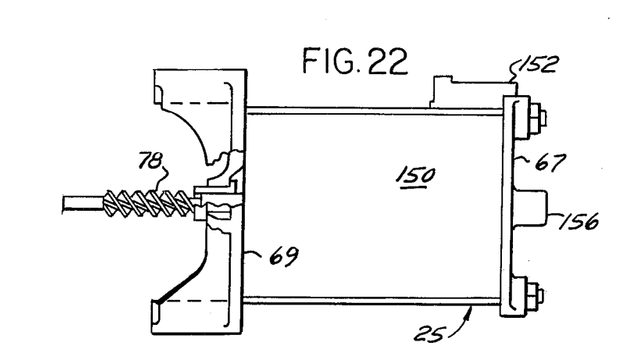
FIG. 22 is a side view of the motor.
Figure 23:
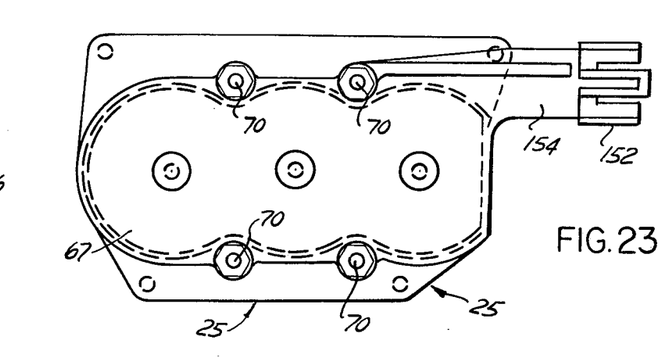
FIG. 23 is an end view of the motor.

As previously mentioned, motor 25 comprises a front mounting plate 67 and a rear plate 69, between which is clamped a field housing 150. Plates 67 and 69 are clamped against field housing 150 by rods or bolts 70.

Plate 67 is provided with a wiring terminal 152 on extension 154, which is connected to switch controls (not shown) capable of selectively energizing the three separate rotatable armatures for forward or reverse rotation.

Figure 24:
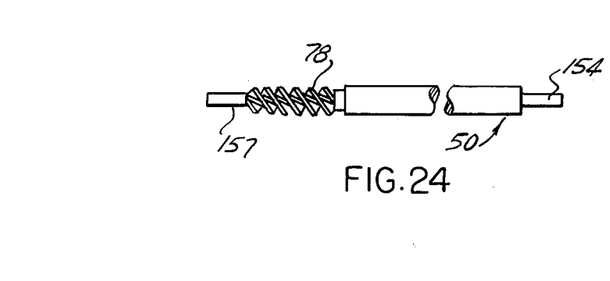
FIG. 24 is a side view of one of the integral armature shaft-primary worms of the motor.

A very important improvement in the combination is in the particular armature shafts, shown in detail in FIG. 24. The three shafts may be identical and FIG. 24 may be assumed to be shaft 50.

Each armature shaft is a single integral member having worm teeth as indicated at 78 cut directly onto the shaft to form the associated primary worm. The inner end of each shaft is reduced as indicated at 154, and front motor plate 67 has three lugs 156 each provided with a blind cylindrical recess which receives reduced shaft end 154 and forms a low friction bearing therefor, plate 68 being formed of a rigid low-friction polymer such as the acetal polymer previously identified. The other end 157 of each armature shaft beyond the integral worm such as worm 78, is reduced as shown for reception in the bearing recesses such as seen at 140 in FIG. 17.

The provision of a three armature motor mounted directly on a transmission housing in which a unitary polymeric spacing and bearing unit is housed and accurately located directly from the motor shaft journals, and in which the rotatable transmission elements connecting the motor shafts to pinions for operating the adjusting devices is a significant improvement over prior practices. The elimination of coupling devices and separate shaft bearings represents a substantial simplification and economy, and the use of the integral armature shaft with the primary worm cut directly into the shaft improves efficiency to the point that permits a small and hence lighter weight motor.

It will be noted that motor shaft bushings such as 145 in FIG. 6 are substantially smaller than openings 72 in the inner housing plate 42. Similarly, lugs 74 on the unit 60 are substantially smaller than openings 76 in the outer housing plate 44. Accordingly, while motor 25 is fixed to inner housing plate 42 by screws 65, 68, the motor and the spacer and bearing unit are located precisely with respect to each other by the reception of armature shaft end 157 in bearing recesses such as seen at 140 in FIG. 17, and by the engagement of partly cylindrical extensions such as seen at 142 in FIG. 17 or at 144 in FIG. 19, with the cylindrical exterior surface of the armature journals 145 of the motor. Thus the unit 60 is accurately located with respect to primary worms 78, 106 and 120, and shafts 82, 92 and 124 are located thereby to position primary worm gears 80, 108 and 122 in position to mesh with the primary worms. The other ends of shafts 82, 92 and 124 are supported in separate bearings 95, 109 and 130. Also shaft 32 which carries rack pinion is journaled in a bearing integral with unit 60. Only lift pinion shafts 102 and 114 are not located by unit 60, and these are journaled at their inner ends in journals mounted in the inner housing plate 42 as seen in FIG. 6. The other ends of these shafts are received in bearings 103a on the carrier 17.

From the foregoing it will be seen that the transmission means connects the several drive shafts of the motor to actuating pinions. The transmission means connecting each motor shaft to a pinion comprises a primary worm-worm gear set and a secondary worm-worm gear set. The worm of the primary worm-worm gear set is connected directly to a motor drive shaft, and is preferably integral with the shaft. The worm gear of the primary worm-worm gear set and the worm of the secondary worm gear set are carried by a primary shaft. The worm gear of the secondary worm-worm gear set and the pinion which drives the associated adjusting device are carried by a secondary shaft.

The motor shaft which carries the worm of the primary worm-worm gear set is located by a bushing provided on the motor and extends outwardly therefrom into an aligned cylindrical locating and bearing recess provided in the spacer and bearing unit and preferably in a lateral projection or lug thereon. The primary shaft has one end rotatably received in a cylindrical bearing and locating recess provided in the spacer and bearing unit and its other end received in a bearing carried by said housing.

The secondary shafts extend through aligned openings in the inner and outer housing plates, the secondary worm gears being located on said secondary shafts within said housing and the drive pinions carried by the secondary shafts being located at least partly exterior of said housing for geared connection to toothed adjusting devices.

This construction simplifies and ensures accuracy of location of assembly of the components of the several transmissions.

Attention is called to the fact that the helix angle of the worm gears in the primary and secondary sets are quite different. In practice the worm teeth which are cut on an armature shaft of the motor have a lead or thread angle of approximately 42½° and accordingly the worm gear of the primary set have corresponding helix angles. In general terms these lead and helix angles preferably exceed 40°. In practice the primary worm as illustrated herein has two teeth or threads.

On the other hand the worm of the secondary worm-worm gear set has a lead or thread angle of about 6° and the secondary worm gear has a corresponding helix angle. In more general terms these secondary lead and helix angles should be less than 10°.

While the motor as so far described is a multiple armature motor provided with permanent magnet field structure, the armatures may be different from each other and designed for the particular power requirements of the seat adjusting mechanisms. Similarly the motor output worms may be different, and have different numbers of starts or threads. In fact, certain aspects of the invention are independent of the specific motor structure, and are equally useful if associated with three completely independent motors simply assembled together to provide parallel laterally spaced output shafts.

I claim:

1. A master seat adjuster power mechanism for attachment to one side of a seat slide having front and rear lift levers pivoted thereto provided with toothed sectors, a stationary rack adjacent the slide to provide front to rear adjustment thereof, said mechanism comprising an elongated housing formed of dished inner and outer housing plates, a multiple armature electric motor assembly secured to said housing at the inner side thereof and having laterally extending shaft supports and parallel armature drive shafts extending through said shaft supports and into the interior of said housing, the outer housing plate having openings in alignment with the armature drive shafts, a spacer and bearing unit within said housing formed of a rigid low friction polymeric material, said unit comprising a plate portion having at its inner side locating projections engaging the shaft supports on said motor assembly and having at its outer side lugs extending with clearance through the openings in the outer housing plate, said lugs having inwardly facing bearing recesses to receive the outer ends of said drive shafts, whereby said motor assembly and unit are precisely located with respect to each other, pinions carried by said housing accessible at its exterior and adapted to mesh with said toothed sectors and rack, transmission gearing located entirely within said housing connecting each of said armature drive shafts to one of said pinions, and shafts supporting said gearing supported essentially on said spacer and bearing unit.

2. Mechanism as defined in claim 1, in which said housing plates have peripheral abutting connection flanges which extend outwardly from said housing, said motor assembly including an attachment flange, and attachment fasteners extending through said abutting flanges and into the attachment flange of said motor assembly.

3. Mechanism as defined in claim 1, in which said armature shafts have worms thereon within said housing, and in which the locating projections of said spacer and bearing unit are laterally projecting partly cylindrical shroud extensions partly surrounding said worms and fitted to the shaft bushings of said motor to locate said unit relative to said motor and its shafts.

4. Mechanism as defined in claim 1, in which said transmission gearing comprises primary and secondary worm-worm gear sets, the worms of said primary sets being formed on said armature shafts, the worm gear of each of said primary sets and the worm of each of said secondary sets being provided on the same primary shaft, one end of each primary shaft being received in a locating bearing recess provided in said spacer and bearing unit and a bearing for the other end of each of said primary shafts secured to said housing at the interior thereof.

5. Mechanism as defined in claim 4, in which the bearings for the said other ends of said primary shafts are mounted in opposed openings in said inner and outer housing plates.

6. Mechanism as defined in claim 4, in which the worm gear of each secondary worm-worm gear set and the pinion actuated thereby are provided on the same secondary shaft, said inner and outer housing plates having opposed openings to accommodate said secondary shafts, bearings in the openings in said inner plate, said spacer and bearing unit having a tubular laterally extending shaft support portion for the secondary shaft carrying the pinion which cooperates with the stationary rack.

7. Mechanism as defined in claim 6, in which the ends of the secondary shafts extending through openings in the outer housing plate are supported in bearings fixed to the seat slide.

8. Mechanism as defined in claim 1, which comprises a slave mechanism at the other side of the seat slide, said slave unit having a pinion on the same axis as the pinion at the master unit which cooperates with the fixed rack, and having also front and rear lift levers pivoted on the same axes as the lift levers of the master unit, a torque tube connected directly between the pinions of the rack and pinion devices, said lift levers having lift arms for connection to a vehicle seat movable upwardly and downwardly with respect to the slide, and torque tubes extending between said master and slave mechanisms and fixed to the movable ends of corresponding lift arms thereof.

9. A master seat adjuster power mechanism for attachment to one side of a seat slide and having front rear lift levers pivoted thereto and provided with toothed sectors, lift pinions on said mechanism in mesh with said sectors, said mechanism having a traverse pinion for engagement with a stationary rack adjacent the seat slide to provide front to rear adjustment of the seat slide, said mechanism comprising a multiple armature electric motor having armature shafts extending outwardly therefrom, and transmission means connecting each of said armature shafts to one of said pinions, said transmission means comprising at least one primary worm-worm gear set in which the worm thereof comprises a worm toothed portion integral with the armature shaft thereof.

10. Mechanism as defined in claim 9, in which the transmission means connecting each of said armature shafts to one of said worms comprises a second worm-worm gear set of which the worm thereof is connected directly to the worm gear of said first worm-worm gear set.

11. Mechanism as defined in claim 10, in which the helix angle of the worm gears in the primary sets exceed 40° and the helix angle of the worm gears in the secondary set is less than 10°.

* * * * *